United States Patent
Washington et al.

(10) Patent No.: US 11,147,253 B2
(45) Date of Patent: Oct. 19, 2021

(54) AUTOMATIC MEDIA INTEGRATED FISHING REEL

(71) Applicants: Johnson Washington, Tickfaw, LA (US); Chad Perkins, Tickfaw, LA (US)

(72) Inventors: Johnson Washington, Tickfaw, LA (US); Chad Perkins, Tickfaw, LA (US)

( * ) Notice: Subject to any disclaimer, the term of this patent is extended or adjusted under 35 U.S.C. 154(b) by 388 days.

(21) Appl. No.: 16/260,701

(22) Filed: Jan. 29, 2019

(65) Prior Publication Data

US 2020/0236917 A1  Jul. 30, 2020

(51) Int. Cl.
*A01K 89/012* (2006.01)
*H04N 5/225* (2006.01)
*A01K 97/00* (2006.01)
*A01K 89/015* (2006.01)

(52) U.S. Cl.
CPC ........ *A01K 89/012* (2013.01); *A01K 89/0192* (2015.05); *A01K 97/00* (2013.01); *H04N 5/2252* (2013.01); *H04N 5/2256* (2013.01)

(58) Field of Classification Search
CPC ........ A01K 89/00; A01K 97/00; A01K 83/00; A01K 87/007; A01K 91/20; A01K 97/125
See application file for complete search history.

(56) References Cited

U.S. PATENT DOCUMENTS

| | | | |
|---|---|---|---|
| 4,515,324 A | 5/1985 | Barton | |
| D370,047 S | 5/1996 | Eberhard | |
| 6,318,653 B1 | 11/2001 | Dobbins | |
| 7,398,939 B2 | 7/2008 | Terauchi | |
| 8,579,222 B1 * | 11/2013 | Alvarez | A01K 89/017 242/225 |
| 8,833,689 B1 * | 9/2014 | Brown | A01K 87/007 242/250 |
| 9,060,500 B2 | 6/2015 | Lauzon | |
| 2005/0247809 A1 * | 11/2005 | Terauchi | A01K 89/017 242/250 |
| 2009/0095835 A1 * | 4/2009 | Beckham | A01K 89/0155 242/286 |
| 2010/0170977 A1 * | 7/2010 | Trell | A01K 89/0155 242/305 |
| 2018/0055031 A1 * | 3/2018 | Wachob | A01K 85/01 |
| 2018/0146122 A1 * | 5/2018 | Campbell | H04N 5/2258 |

* cited by examiner

*Primary Examiner* — Jayanti K Patel
*Assistant Examiner* — Christopher Kingsbury Glover

(57) ABSTRACT

An automatic media integrated fishing reel for automating reel in, capturing video, and providing entertainment includes a reel housing having a removable top having a line aperture extending through to an inner cavity. A base is coupled to the reel housing and is configured to attach to a fishing pole. A line spool is coupled within the inner cavity and is configured to receive a fishing line. A motor is coupled to the line spool to wind and unwind the fishing line on the line spool. A power source is coupled within the inner cavity and is in operational communication with the motor. A plurality of control buttons is in operational communication with the motor. A video recorder is coupled to the reel housing. A CPU is in operational communication with each of the motor, the power source, the plurality of control buttons, and the video recorder.

9 Claims, 4 Drawing Sheets

AUTOMATIC MEDIA INTEGRATED FISHING REEL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to fishing reels and more particularly pertains to a new fishing reel for automating reel in, capturing video, and providing entertainment.

BRIEF SUMMARY OF THE INVENTION

An embodiment of the disclosure meets the needs presented above by generally comprising a reel housing having a removable top, an inner cavity, a front side, a back side, a right side, a left side, and a bottom side. The removable top has a line aperture extending through to the inner cavity. A base is coupled to the reel housing and is configured to attach to a fishing pole. A line spool is coupled within the inner cavity and is configured to receive a fishing line. A motor is coupled to the line spool to wind and alternatively unwind the fishing line on the line spool. A power source is coupled within the inner cavity and is in operational communication with the motor. A plurality of control buttons is coupled to the front side proximal the bottom side and is in operational communication with the motor. A video recorder is coupled to the reel housing. A CPU is coupled within the inner cavity and is in operational communication with each of the motor, the power source, the plurality of control buttons, and the video recorder.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
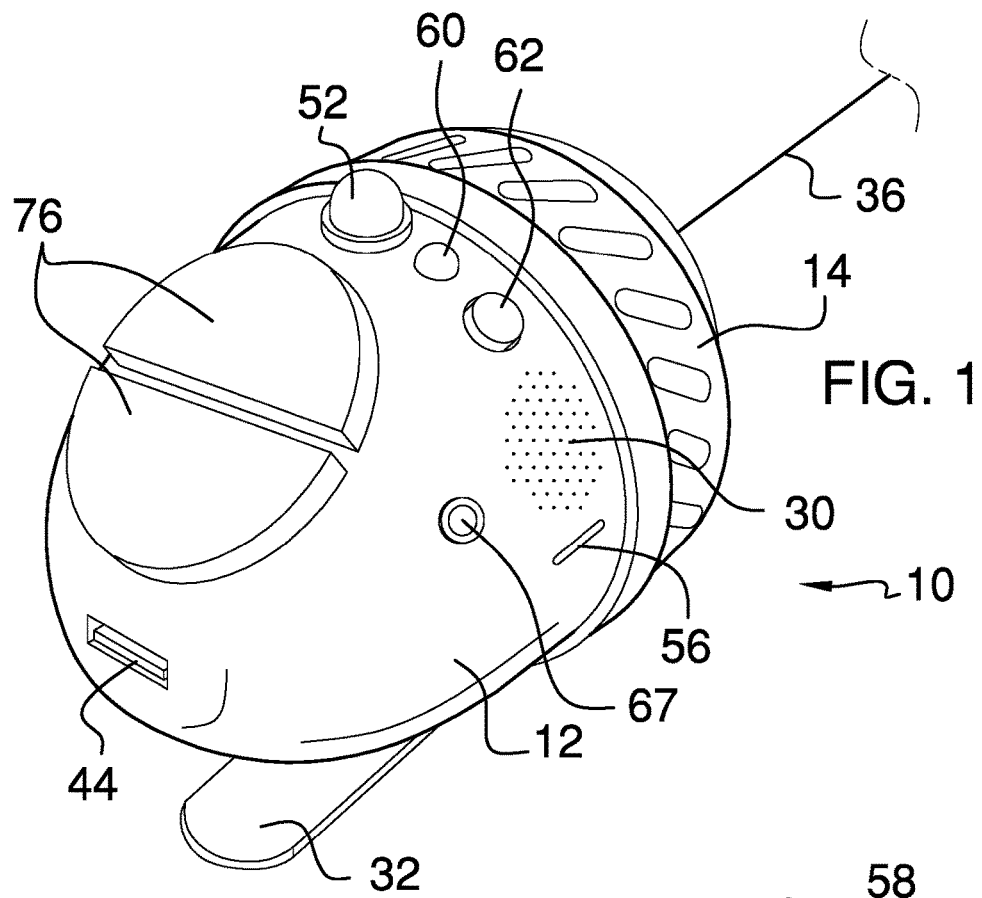
FIG. 1 is an isometric view of an automatic media integrated fishing reel according to an embodiment of the disclosure.
Figure 2:
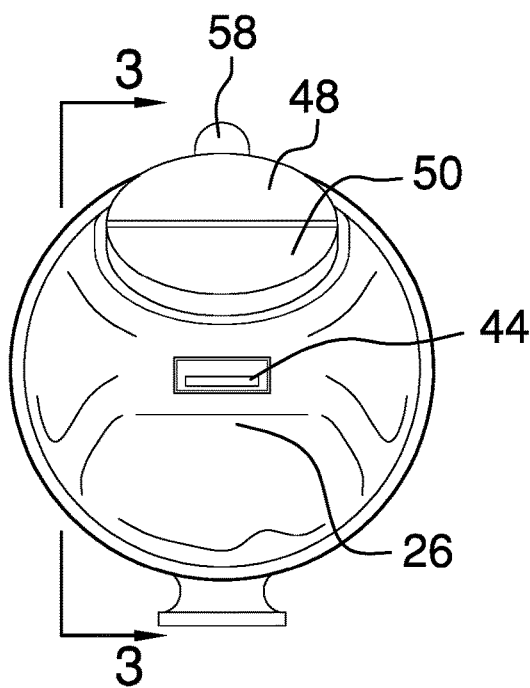
FIG. 2 is a bottom plan view of an embodiment of the disclosure.
Figure 3:
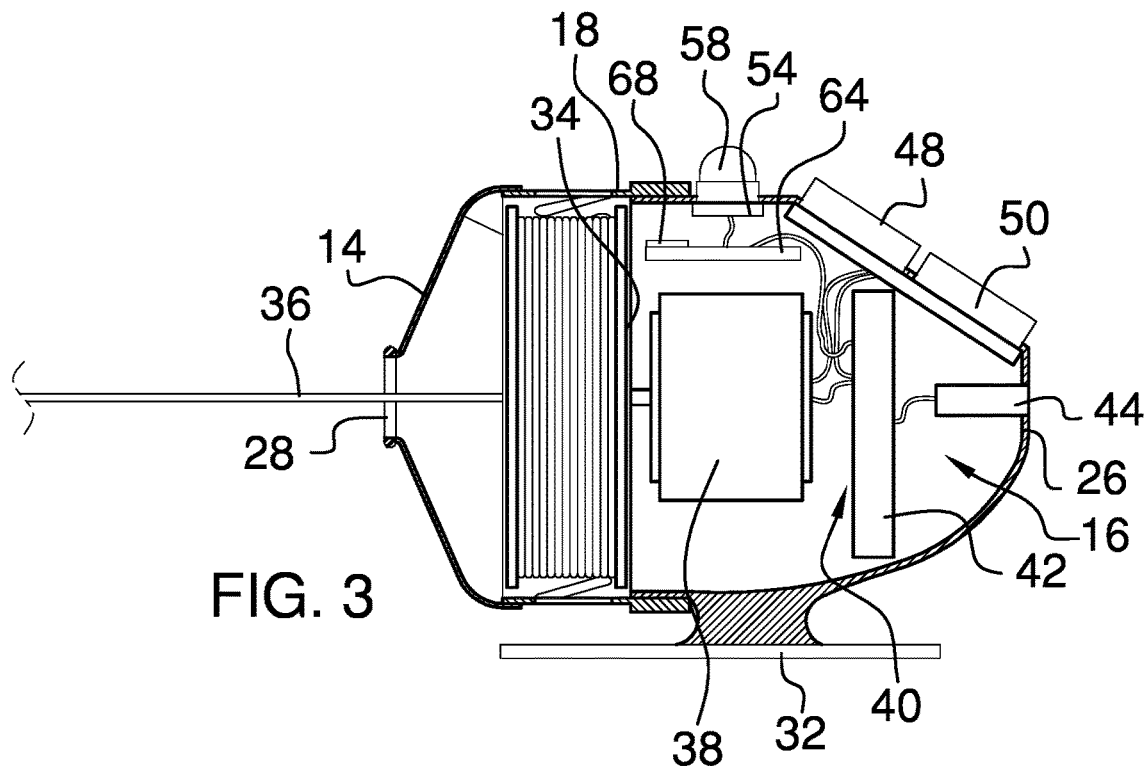
FIG. 3 is a cross-sectional view of an embodiment of the disclosure along line 3-3 of FIG. 2.
Figure 4:
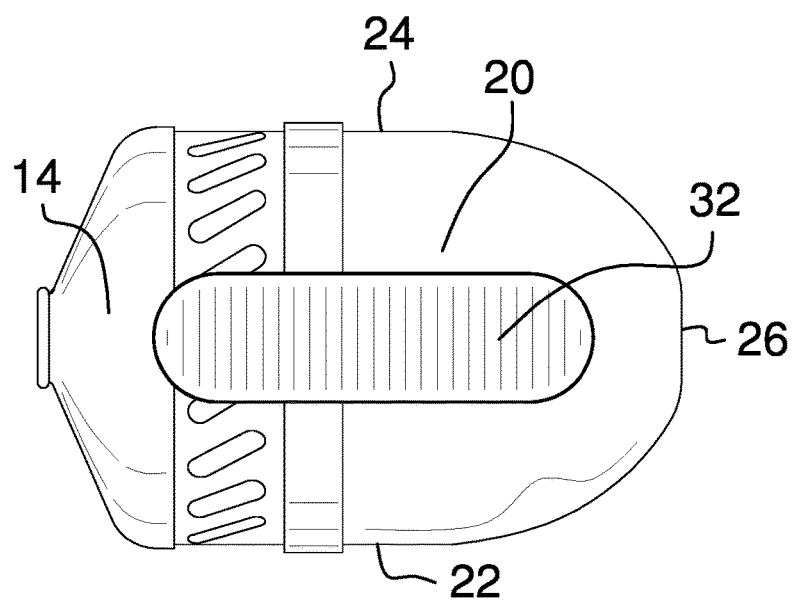
FIG. 4 is a rear elevation view of an embodiment of the disclosure.
Figure 5:
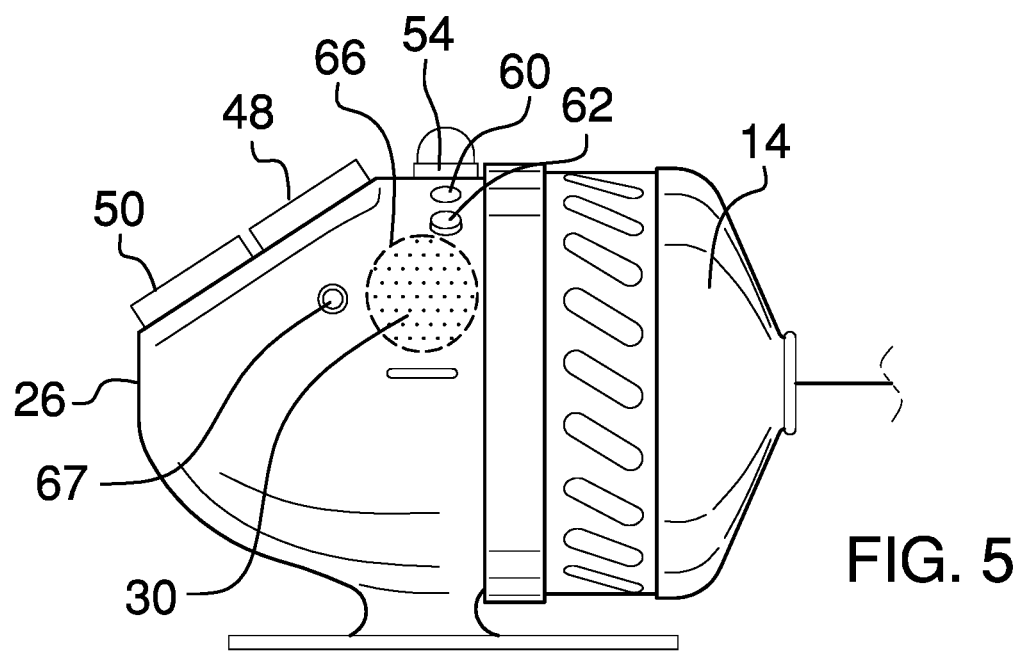
FIG. 5 is a side elevation view of an embodiment of the disclosure.
Figure 6:
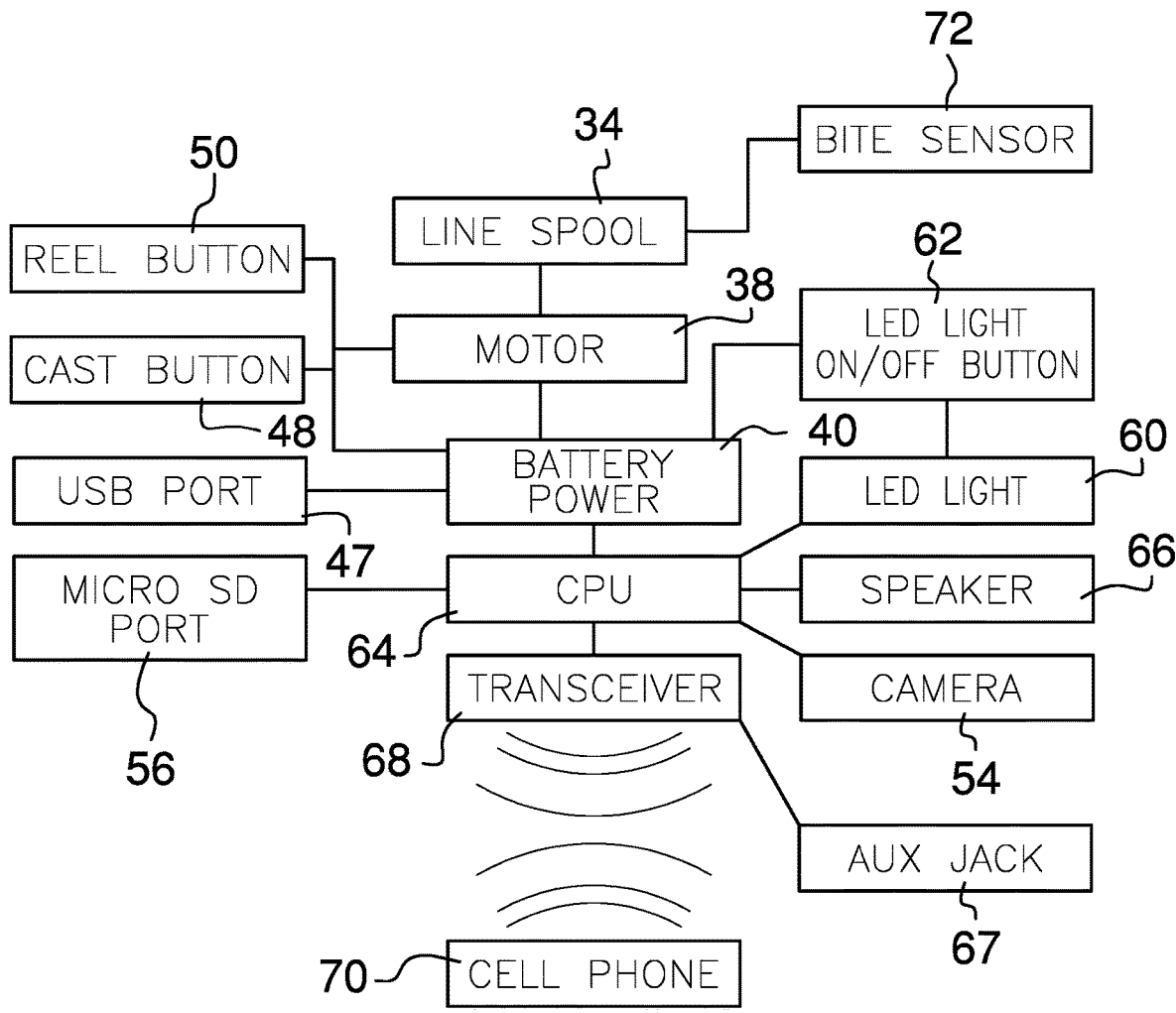
FIG. 6 is a block diagram of an embodiment of the disclosure.

With reference now to the drawings, and in particular to FIGS. 1 through 6 thereof, a new fishing reel embodying the principles and concepts of an embodiment of the disclosure and generally designated by the reference numeral 10 will be described.

As best illustrated in FIGS. 1 through 6, the automatic media integrated fishing reel 10 generally comprises a reel housing 12 having a removable top 14, an inner cavity 16, a front side 18, a back side 20, a right side 22, a left side 24, and a bottom side 26. The removable top 14 has a line aperture 28 extending through to the inner cavity 16. The right side 22 may have a speaker grille aperture 30. A base 32 is coupled to the reel housing 12 and is configured to attach to a fishing pole. A line spool 34 is coupled within the inner cavity 16 and is configured to receive a fishing line 36. A motor 38 is coupled to the line spool 34 to wind and alternatively unwind the fishing line 36 on the line spool 34. A power source 40 is coupled within the inner cavity 16 and is in operational communication with the motor 38. The power source 40 may comprise a rechargeable battery 42 and a USB port 44. The USB port 44 is coupled through the bottom side 26 of the reel housing and is in operational communication with the rechargeable battery 42. A plurality of control buttons 46 is coupled to the front side 18 of the reel housing proximal the bottom side 26. The plurality of control buttons 46 is in operational communication with the motor 38 and may comprise a cast button 48 and a reel-in button 50. Each of the cast button 48 and the reel-in button 50 may be hemispherical. The cast button 48 releases the motor 38 to allow the fishing line 36 to be cast out and the reel-in button 50 activates the motor 38 to reel in the fishing line 36.

A video recorder 52 is coupled to the reel housing 12 and comprises a camera 54 and a storage port 56. The camera 54 is coupled to the front side 18 of the reel housing and has a cover dome 58 for protection, particularly from getting wet. The storage port 56 is coupled through the right side 22 of the reel housing and is in operational communication with the camera 54. The storage port 56 is configured to receive a memory card such as a micro SD card. An LED light 60 may be coupled to the reel housing 12 adjacent the cover dome 58 of the camera. A light power button 62 is coupled adjacent the LED light 60. The light power button 62 is in operational communication with each of the LED light 60 and the power source 40. A CPU 64 is coupled within the inner cavity 16 and is in operational communication with each of the motor 38, the power source 40, the plurality of control buttons 46, the light power button 62, and the video recorder 52. A speaker 66 may be coupled within the inner cavity 16 adjacent the speaker grille aperture 30. The speaker 66 is in operational communication with the CPU 64. An auxiliary jack 67 may be coupled adjacent the speaker 66. The auxiliary jack 67 is in operational communication with the CPU 64. A transceiver 68 may be coupled within the inner cavity 16. The transceiver 68 is in operational communication with each of the speaker 66 and the video recorder 52. The transceiver 68 is configured to wirelessly connect to a smartphone 70 to send video from the video recorder 52 and play audio through the speaker 66 or the auxiliary jack 67 if a pair of headphones is connected. A bite sensor 72 may be coupled to the line spool 34 and is in operational communication with the CPU 64. The bite sensor 72 detects when a fish has pulled on the fishing line 36 and produces an alert through the speaker 66 or the auxiliary jack 67 when activated.

In use, the reel housing 12 is attached to the fishing pole using the base 32. It is then cast using the cast button 48 and reeled in using the reel-in button 50. Video of the action may be captured by the video recorder 52 and stored to the memory card in the storage port 56 or sent to the smartphone 70 via the transceiver 68. Music may also be played from the smartphone 70 through the speaker 66 for entertainment.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An automatic media integrated fishing reel comprising:
   a reel housing, the reel housing having a removable top, an inner cavity, a front side, a back side, a right side, a left side, and a bottom side, the removable top having a line aperture extending through to the inner cavity;
   a base coupled to the reel housing, the base being configured to attach to a fishing pole;
   a line spool coupled to the reel housing, the line spool being coupled within the inner cavity, the line spool being configured to receive a fishing line;
   a motor coupled to the line spool, the motor winding and alternatively unwinding the fishing line on the line spool;
   a power source coupled to the reel housing, the power source being coupled within the inner cavity, the power source being in operational communication with the motor;
   a plurality of control buttons coupled to the reel housing, the plurality of control buttons being coupled to the front side proximal the bottom side, the plurality of control buttons being in operational communication with the motor;
   a video recorder coupled to the reel housing;
   a CPU coupled to the reel housing, the CPU being coupled within the inner cavity, the CPU being in operational communication with each of the motor, the power source, the plurality of control buttons, and the video recorder; and
   a speaker and an auxiliary jack coupled to the reel housing, the speaker being coupled within the inner cavity adjacent a speaker grille aperture of the right side, the auxiliary jack being coupled adjacent the speaker, the speaker and the auxiliary jack being in operational communication with the CPU.

2. The automatic media integrated fishing reel of claim 1 further comprising a transceiver coupled to the reel housing, the transceiver being coupled within the inner cavity, the transceiver being in operational communication with each of the speaker, the video recorder, and the CPU, the transceiver being configured to wirelessly connect to a smartphone to send video from the video recorder and play audio through the speaker.

3. The automatic media integrated fishing reel of claim 1 further comprising the plurality of control buttons comprising a cast button and a reel-in button, each of the cast button and the reel-in button being hemispherical, the cast button releasing the motor to allow the fishing line to be cast out, the reel-in button activating the motor to reel in the fishing line.

4. The automatic media integrated fishing reel of claim 1 further comprising a bite sensor coupled to the line spool, the bite sensor being in operational communication with the CPU, the bite sensor detecting when a fish has pulled on the fishing line and producing an alert through the speaker or the auxiliary jack when activated.

5. The automatic media integrated fishing reel of claim 1, further comprising:
   the right side having a speaker grille aperture;
   the power source comprising a rechargeable battery and a USB port, the USB port being coupled through the bottom side of the reel housing, the USB port being in operational communication with the rechargeable battery;
   the plurality of control buttons comprising a cast button and a reel-in button, each of the cast button and the reel-in button being hemispherical, the cast button releasing the motor to allow the fishing line to be cast out, the reel-in button activating the motor to reel in the fishing line;
   the video recorder comprising a camera and a storage port, the camera being coupled to the front side of the reel housing, the camera having a cover dome to protect the camera, the storage port being coupled through the right side of the reel housing, the storage port being in operational communication with the camera, the storage port being configured to receive a memory card;

an LED light coupled to the reel housing, the LED light being coupled adjacent the cover dome of the camera;

a light power button coupled to the reel housing, the light power button being coupled adjacent the LED light, the light power button being in operational communication with each of the LED light and the power source;

an auxiliary jack coupled to the reel housing, the auxiliary jack being coupled adjacent the speaker, the auxiliary jack being in operational communication with the CPU;

a bite sensor coupled to the line spool, the bite sensor being in operational communication with the CPU, the bite sensor detecting when a fish has pulled on the fishing line and producing an alert through the speaker or the auxiliary jack when activated; and a transceiver coupled to the reel housing, the transceiver being coupled within the inner cavity, the transceiver being in operational communication with each of the speaker, the video recorder, and the CPU, the transceiver being configured to wirelessly connect to a smartphone to send video from the video recorder and play audio through the speaker.

6. An automatic media integrated fishing reel comprising:
a reel housing, the reel housing having a removable top, an inner cavity, a front side, a back side, a right side, a left side, and a bottom side, the removable top having a line aperture extending through to the inner cavity;
a base coupled to the reel housing, the base being configured to attach to a fishing pole;
a line spool coupled to the reel housing, the line spool being coupled within the inner cavity, the line spool being configured to receive a fishing line;
a motor coupled to the line spool, the motor winding and alternatively unwinding the fishing line on the line spool;
a power source coupled to the reel housing, the power source being coupled within the inner cavity, the power source being in operational communication with the motor;
a plurality of control buttons coupled to the reel housing, the plurality of control buttons being coupled to the front side proximal the bottom side, the plurality of control buttons being in operational communication with the motor;
a video recorder coupled to the reel housing;
a CPU coupled to the reel housing, the CPU being coupled within the inner cavity, the CPU being in operational communication with each of the motor, the power source, the plurality of control buttons, and the video recorder; and the video recorder comprising a camera and a storage port, the camera being coupled to the front side of the reel housing, the storage port being coupled through the right side of the reel housing, the storage port being in operational communication with the camera, the storage port being configured to receive a memory card.

7. The automatic media integrated fishing reel of claim 6 further comprising the camera having a cover dome, the cover dome protecting the camera.

8. The automatic media integrated fishing reel of claim 7 further comprising an LED light coupled to the reel housing adjacent the cover dome and a light power button coupled adjacent the LED light, the light power button being in operational communication with each of the LED light and the power source.

9. An automatic media integrated fishing reel comprising:
a reel housing, the reel housing having a removable top, an inner cavity, a front side, a back side, a right side, a left side, and a bottom side, the removable top having a line aperture extending through to the inner cavity;
a base coupled to the reel housing, the base being configured to attach to a fishing pole;
a line spool coupled to the reel housing, the line spool being coupled within the inner cavity, the line spool being configured to receive a fishing line;
a motor coupled to the line spool, the motor winding and alternatively unwinding the fishing line on the line spool;
a power source coupled to the reel housing, the power source being coupled within the inner cavity, the power source being in operational communication with the motor;
a plurality of control buttons coupled to the reel housing, the plurality of control buttons being coupled to the front side proximal the bottom side, the plurality of control buttons being in operational communication with the motor;
a video recorder coupled to the reel housing;
a CPU coupled to the reel housing, the CPU being coupled within the inner cavity, the CPU being in operational communication with each of the motor, the power source, the plurality of control buttons, and the video recorder; and
the power source comprising a rechargeable battery and a USB port, the USB port being coupled through the bottom side of the reel housing, the USB port being in operational communication with the rechargeable battery.

* * * * *